April 18, 1961 R. J. STATEN 2,980,890
SIGNALING SYSTEMS
Filed March 10, 1959 2 Sheets-Sheet 1

INVENTOR
RAYMOND J. STATEN
BY
Byerly, Townsend, Watson & Churchill
ATTORNEYS

April 18, 1961  R. J. STATEN  2,980,890
SIGNALING SYSTEMS
Filed March 10, 1959  2 Sheets-Sheet 2
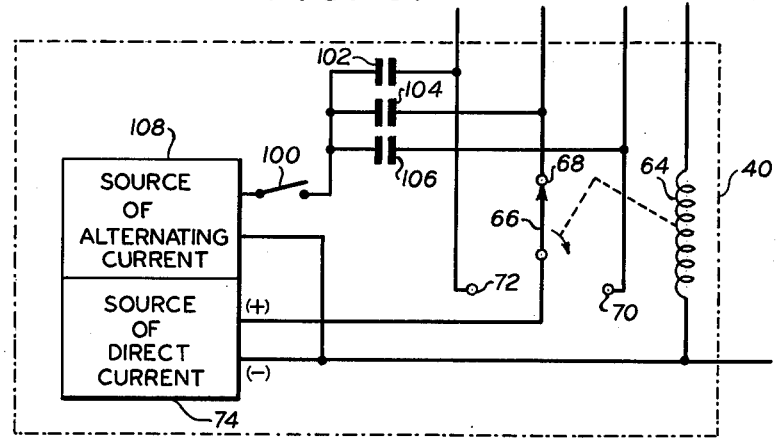
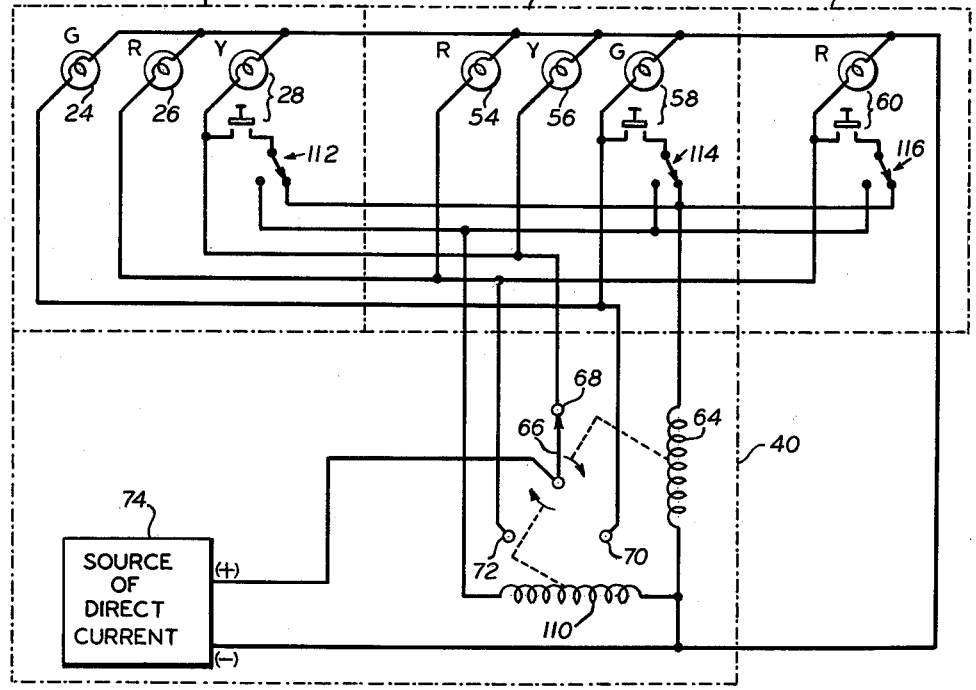
INVENTOR
RAYMOND J. STATEN
BY
ATTORNEYS United States Patent Office 2,980,890
Patented Apr. 18, 1961

2,980,890

SIGNALING SYSTEMS

Raymond J. Staten, Port Washington, N.Y., assignor, by mesne assignments, to The Transvox Corporation, Washington, N.Y., a corporation of New York Filed Mar. 10, 1959, Ser. No. 798,543

14 Claims. (Cl. 340—153)

The present invention relates to a signaling system and more particularly to a signaling system for reporting and/or directing the performance in the proper sequence of a number of separate operations.

There are many instances in business and industry where it is necessary or desirable to monitor or control the sequential performance of a number of operations. For example, in a manufacturing installation certain key personnel must be kept advised as to the flow or status of production from stage to stage. In the field of transportation, knowledge of the status of equipment, whether in operation, in the shop, and so forth is of considerable importance.

Perhaps typical of such situations is the problem of supervising or monitoring room status in a hotel. The desk clerk must know when a room is available for occupancy, the cashier must know when it is occupied, and the housekeeper must know as soon as the room is vacated that it requires making up. At the same time, the overall picture should be available to the manager. The supervisory system must be foolproof. It must, except for the possibility of error correction, be one-way in operation. That is, when the desk clerk wishes to signal the cashier that a room has been rented, it should be impossible for him to accidentally signal the housekeeper that it is vacated. In like manner the housekeeper should be unable to signal that a room is ready for occupancy before the previous occupant's bill has been paid, i.e., he has checked out. There should also be provision for conveniently checking or testing the operativeness of the system.

All of the foregoing is reliably accomplished by the apparatus which forms the subject of the present invention. Specifically, there is provided in accordance with the present invention a signaling system for a plurality of separate stations at each of which a distinct manually initiated operation is performed; said signaling system being adapted to report and direct the performance of said operations at the respective stations in a predetermined sequential order and comprising: an indicator associated with each station, a manually operable switch associated with each station, a central selector device, and means intercoupling said indicators, switches and selector device so that only one indicator can be actuated by the selector device at a time, and actuation by the selector device of an indicator associated with one station is accompanied by simultaneous conditioning of the switch associated with that station so that subsequent operation of the switch causes operation of the selector device to actuate the indicator and condition the switch associated with the next succeeding station in said sequence.

In order that my invention will be fully available to those skilled in the art, the following detailed description of a preferred embodiment thereof, and several modifications which may be incorporated therein, is given with reference to the appended drawings in which:

Fig. 3 is a fragmentary schematic circuit diagram showing a modified testing circuit for use with the circuit of Fig. 2; and Fig. 4 is a schematic circuit diagram similar to Fig. 2 but showing the incorporation of both forward and reverse sequential operation and representing a modification of the invention.

Figure 1:
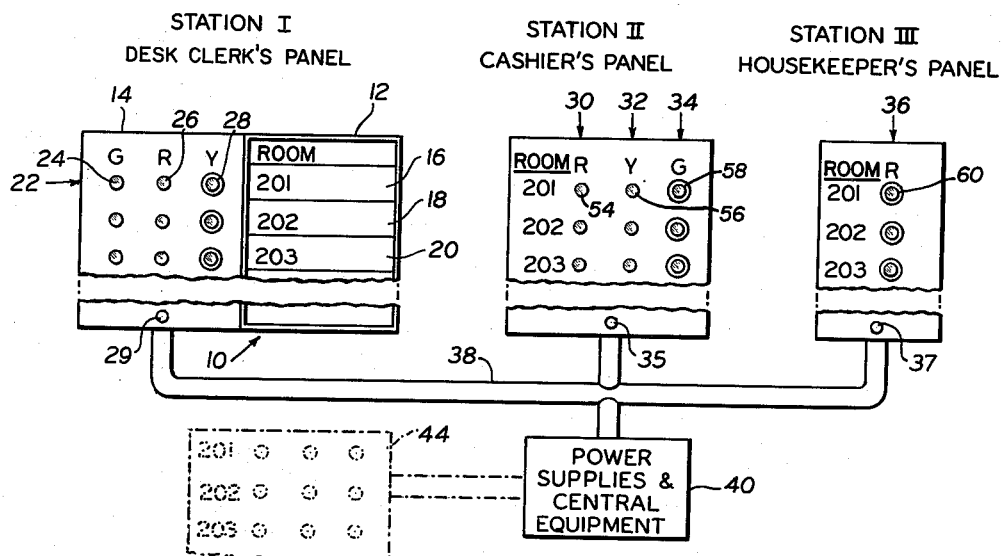
Fig. 1 is a diagrammatic representation of a signaling system as applied to hotel room supervision in accordance with the invention.

Referring now more particularly to Fig. 1, it is assumed that supervision or monitoring (i.e., directing and reporting) is required with respect to three separate stations designated by the numerals I, II and III as would be found in a hotel. Station I represents the position of the desk clerk, station II represents the position of the cashier, while station III represents the position of the housekeeper.

At station I the desk clerk is provided with a novel room rack designated generally by the numeral 10. The room rack is divided into two sections 12 and 14. The section 12 is in the form of a rack having a number of slots, one for each room of the hotel, such as the slots 16, 18 and 20 bearing the corresponding room numbers 201, 202 and 203. In the use of this part of the rack, the desk clerk, when he rents a room, fills out a card with the name of the occupant, his address, the rate of the room and the estimated duration of stay. This card is then slipped into the appropriate slot in the section 12 of the rack 10. As seen in the drawing, a row 22 of signal lamps 24, 26 and 28 is mounted in the section 14 adjacent the slot for room 201. In like manner, a similar row of three lamps is provided for each of the other rooms. Although all the lamps may be of one color it is preferable that each column be of a different color. For the purpose of illustration, it will be assumed that all the lamps in the column containing lamp 24 are green. The column containing lamp 26 may have red lamps, whereas the colum containing lamp 28 may have yellow lamps. In the appended drawings, in lieu of actual colors, the letters G, R, and Y have been inserted at the top of each column as a color symbol. The letters of course, would not appear on the actual equipment.

The signal lamps in one of the columns, preferably the column nearest to the section 12 of the rack, are of the type which consist of a combination push-button switch and indicator lamp. The push button is made of translucent material and can be illuminated by an associated lamp. It is believed that these are well known and need not be described in detail. When, however, mention should be made hereinafter of pushing one of the lamps, it will be understood that it is the switch associated therewith that is being actuated.

In addition to the push-button switches already mentioned, there is provided a separate push-button switch of conventional construction, 29, which may be mounted at the bottom of the section 14 in the rack 10. This is a test switch and has a further function, all of which will be described in further detail hereinafter.

The panel which is provided at station II for the use of the cashier has a row for each room in the hotel which consists of a red lamp 54 in the column designated 30 a yellow lamp 56 in the column designated 32 and a combination push-button switch and green signal lamp 58 in the column designated 34. A test switch in the form of a push-button switch 35, is provided at the bottom of the panel.

At station III is located the panel for the use of the housekeeper. If there is more than one housekeeper in the hotel, or it is desired to have individual floor supervision or the like, the panel need contain supervisory equipment only for those rooms under the control of the particular housekeeper. Additional panels at further stations would be provided for the remaining rooms. Furthermore, since the housekeeper does not require all the information which is made available to the clerk and the cashier, her panel need contain only one column of combination signal lamps and push-button switches designated by the numeral 36. A push-button switch 37, for the same purpose as switches 29 and 35, is also provided in the panel at station III.

All of the panels are interconnected by cabling through conduits 38, or the like, with the power supplies and central equipment 40. If desired additional panel boards such as the board 44 may be interconnected with the central equipment 40 for providing monitoring information at other stations. In a hotel, such a panel could be located in the office of the manager and contain a set of three signal lamps for each room as indicated in the drawing.

Figure 2:
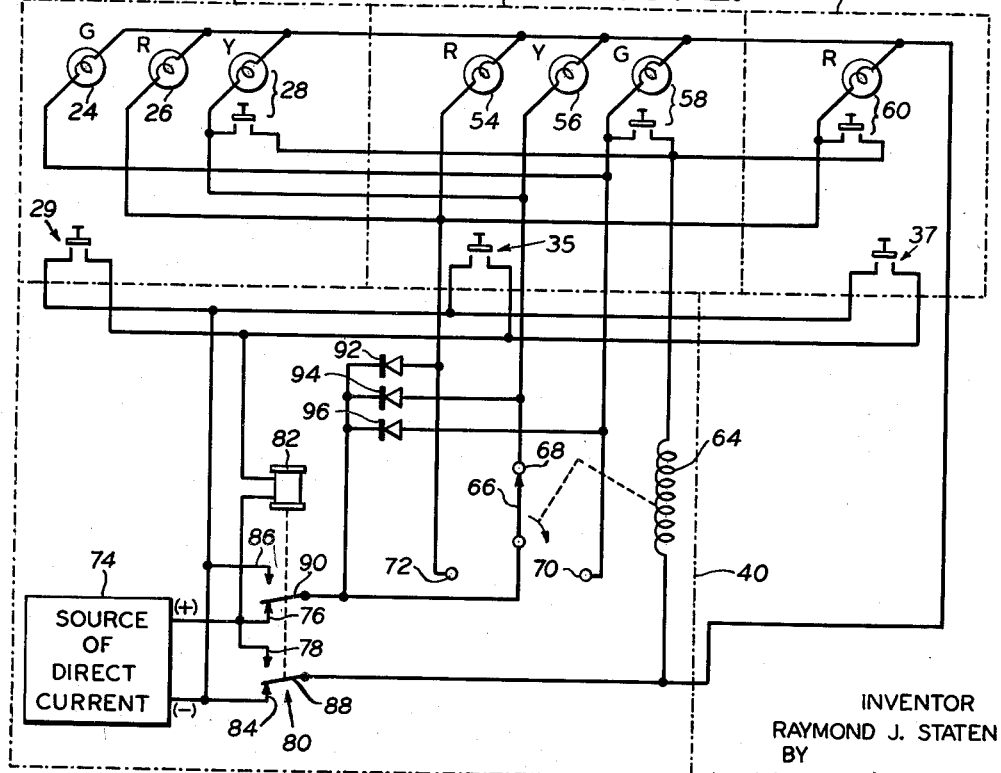
Fig. 2 is a schematic circuit diagram showing one set of supervisory components which can be used in the system of Fig. 1.

Before discussing the operation of the system, reference should be had to Figure 2 which illustrates details of the circuit. For convenience, only the equipment associated with one room is illustrated, it being understood that the circuit for each room is the same. Where appropriate, the reference numerals which are used in Figure 1 are also used in Figure 2 to designate the same or similar parts.

Considering the equipment for room 201, that shown within the box 50 represents the equipment at station I. Box 52 represents the equipment for the cashier's panel including the red lamp 54, the yellow lamp 56, and the combination green lamp and push-button switch 58. The combination red lamp and push-button switch 60 located at the housekeeper's panel is shown within the box 62. As part of the central equipment, there is provided a sequencing device in the form of an electro-mechanical stepping switch having a solenoid 64, a wiper arm 66, and three fixed contacts 68, 70 and 72. It is to be understood that each time a voltage impulse is applied to the solenoid 64, the wiper arm 66 is advanced one step from one fixed contact to the next. A source of direct current 74 of suitable voltage to energize the stepping switch and the signal lamps has its positive terminal connected to the fixed contacts 76 and 78 of a relay 80 and through the relay winding 82 to one terminal of each of the switches 29, 35 and 37. The opposite terminals of the switches 29, 35 and 37 are joined together and connected to the negative terminal of the source 74. The latter terminal is connected in turn to the fixed contacts 84 and 86 of relay 80, all as shown in the drawing. It will be seen that all of the signal lamps as well as the solenoid 64 have one terminal connected to the armature 88 of relay 80. The second armature 90 of the relay is connected both to the wiper arm 66 and to the cathodes of three rectifiers 92, 94 and 96. The anodes of the rectifiers are connected, respectively, to the fixed contacts 72, 68 and 70 of the sequencing device. The two green lamps 24 and 58 have their other terminals joined together and connected to the contact 70 of the sequencing switch. The three red lamps 26, 54, and the lamp in the combination 60, have their other terminals joined together and connected to the fixed contact 72 of the sequencing switch. Finally, the two yellow lamps 28 and 56 have their other terminals joined together and connected to the fixed contact 68 of the sequencing switch. All of the push-button switches 28, 58 and 60 have one terminal joined together and connected to the free end of the solenoid 64. The other end of the switch 28 is connected to the fixed contact 68 of the sequencing switch. In similar manner the other end of the switch 58 is connected to the fixed contact 70, and the other end of the switch 60 is connected to the fixed contact 72 of the sequencing switch. The operation of the circuit can now be described.

With the sequencing switch and the relay 80 in the positions shown in Figure 2 of the drawing, a circuit is completed from the positive terminal of the source of direct current 74 through contact 76 and armature 90 to the wiper 66 and then in parallel through the two yellow lamps 28 and 56 to the armature 88 and through contact 84 to the negative side of the source. Thus, the two yellow lamps are illuminated. In the system under discussion this will convey to the room clerk the information that the room is ready for occupancy. When the clerk has rented the room in question he will push the button 28 closing the switch associated therewith. This will complete a circuit from the fixed contact 68 of the sequencing switch through the switch 28 and through the solenoid 64, armature 88 and contact 84 to the negative terminal of source 74. This will advance the sequencing switch to the next contact 70. In this manner the yellow lamps are extinguished and the two green lamps 24 and 58 are illuminated. At the same time, the switch 28 is removed from the circuit, while the switch 58 is connected to the source of direct current ready to energize the solenoid 64 upon closure of the former. The illuminated green lamps convey the information to both the clerk and the cashier that the room is rented. No information is conveyed to the housekeeper at this time.

When the occupant of the room in question checks out, he will pay his bill to the cashier. At this time the cashier will depress the switch 58 associated with the room and complete an energizing circuit for the solenoid 64. This will advance the sequencing switch one more step to the fixed contact 72. In this position the red lamps 26, 54 and 60 are illuminated and the switch 60 at the housekeeper's station is now ready to advance the sequencing switch. Since the switch 58 is no longer connected to the source of current it cannot falsely or improperly advance the sequencing switch. The same is true, of course, of the switch 28 at the clerk's position. With contact 72 of the sequencing switch engaged by the wiper 66, the red lamps are illuminated, as mentioned above, and the housekeeper is informed that the occupant of the room has checked out and that the room should be readied for another occupant. When the maid has finished with her work and so informs the housekeeper, the latter presses the button 60 associated with the room and this completes a circuit through the solenoid 64 to advance the wiper 66 back to the initial position on contact 68 illuminating all of the yellow lamps. This informs the clerk that the room is now ready for occupancy again. It should now be understood that the position of the various lamps in different columns normally would be sufficient to convey the desired information. However, the use of colored lamps is desirable for easier observation.

When it is desired to test the operativeness of all of the lamps on a particular panel board all that is required is to depress the associated test switch. Thus, for example the cashier would close the switch 29. Closure of any one of the switches 29, 35 and 37 which are connected in parallel will energize the winding 82 of relay 80. When winding 82 is energized it will move the armatures 88 and 90 to break contact with contacts 84 and 76 and engage contacts 78 and 86. This reverses the polarity of the voltage applied to the rectifiers 92, 94 and 96 such that each is rendered conductive, bypassing the stepping switch. By tracing the circuit it will be seen that all of the signal lamps on all of the panel boards are energized simultaneously regardless of the position of the sequencing device. In this manner, any defective lamp can be readily detected. Upon release of button 29 the relay 80 will be de-energized and the armatures 88 and 90 will return to the positions shown in the drawing. This re-establishes the conditions prevailing immediately prior to the test.

Besides being used for test purposes, the switches 29, 35 and 37 have another function. Although most errors are ruled out by the very nature of the present signaling system, it still is desirable to have some arrangement for correcting those few which are unavoidable. It may be that a prospective occupant at the time of registering changes his mind with respect to a particular room. The clerk may already have pushed the button signifying that the room has been occupied. With the circuit of Fig. 2 it is possible to effect a convenient correction of the system.

When a test switch such as 29 is closed causing the relay 80 to operate, all three rectifiers 92, 94 and 96 will be rendered conductive. Now assume that while holding button 29 depressed the clerk were to push the button 28. This will complete a circuit from the positive terminal of the source 74 through contact 78, the armature 88, the solenoid 64, switch 28, rectifier 94, armature 90, contact 86, back to the negative terminal of the source 74. In other words the stepping switch has been bypassed such that regardless of its position the closure of room switch 28 will energize the solenoid 64 to advance the stepping switch to its next position. By repeating this procedure of simultaneously operating the test button and the room button it is possible to completely recycle the sequencing device and reset it to any desired position.

If additional panel boards such as 44 in Fig. 1 is added to the circuit, the lamps for each room would be interconnected with the central sequencing device in the same manner as the lamps in boxes 50, 52 and 62 of Fig. 2. It should be understood, also, that the source of current 74 as well as the relay 80 need not be duplicated for each room. However, it is necessary to provide a separate sequencing switch for each room as well as individual sets of rectifiers and duplication of the equipment in boxes 50, 52 and 64 with the exception of the test switches.

The system described to this point represents the presently preferred form thereof; however, it is recognized that many changes can be made while retaining the basic principles. Thus, the central equipment and power supplies in box 40 in Fig. 2 may be replaced by the circuit shown in Fig. 3. As shown, the individual test switches have been eliminated and replaced by a single test switch 100 at the location of the central equipment. The relay 80 is replaced by a direct connection from the positive terminal of source 74 to the wiper 66 of the stepping switch, and a direct connection from the negative terminal of source 74 to solenoid 64. The rectifiers have now been replaced by three condensers 102, 104 and 106 with their common junction connected through switch 100 to one terminal of a source of alternating current 108. The other terminal of the source 108 is connected to the negative terminal of source 74.

With the circuit modified as shown in Fig. 3 the operation of the sequencing device by the room switches remains the same as described above with reference to Fig. 2. However, when it is desired to test the operativeness of all the lamps all that is necessary is to depress or close the switch 100. This will apply alternating current through the condensers 102, 104 and 106 to all of the lamps in parallel and back through the common line to the negative terminal of source 74. The condensers, of course, serve to isolate the green, red and yellow circuits from each other with respect to direct current. The voltage of the source 108 and the impedance of the condensers 102, 104 and 106 are chosen in well known manner to apply the proper voltage to the signal lamps.

Although not shown in the drawing, switch 100 could be replaced by a relay in a manner similar to relay 80 of Fig. 2 such that testing might be performed at each station rather than at the location of the central equipment.

With the equipment described so far, both the clerk and the cashier and, if desired, the manager are informed as to the status of each room at all times. The system can be simplified, however, by eliminating the red and green lamps from station I and the yellow and red lamps from station II. Each station will still include means for indicating when an operation is to be performed at that particular station. If physical space permits, the combined indicator switches may be replaced by separate components. For example, it may be desirable to separate the switch and indicator lamp for station III so that the lamp can be in the housekeeper's quarters while the switch can be located adjacent each room. With this arrangement the maid can operate the switch for a room as she leaves that room. Preferably the switch should be key controlled to avoid unauthorized operation.

As described, the system employs three lamps and three positions. However, this system could be adapted to as many lamps or as many remote positions as required by its particular application. Remote positions or stations could incorporate just a push button or a one or more lamp indicating system. A monitor board such as 44 in Fig. 1 could be tapped from this system and located at a central point to indicate the position of each sequencing switch.

In certain installations employing the present invention it may be necessary to have provision for two way or bi-directional operation. For this purpose the circuit shown in Fig. 4 would be employed. Referring to the drawing it will be observed that identical reference numerals are used in Figs. 2 and 4 to designate the same or similar part.

The three panel boards 50, 52 and 62 may be basically the same as in Fig. 2. However, in Fig. 4 the right hand terminals of the switches 28, 58 and 60 are each connected to the armature of a separate selector switch, respectively, 112, 114 and 116. The right hand fixed terminal of switches 112, 114 and 116 are joined together and to the solenoid 64 for the sequencing device. It will be appreciated, therefore, that with the switches 112, 114 and 116 in the positions shown in the drawing, the circuit operates in the exact same manner as the circuit of Fig. 2.

Unlike Fig. 2, the left hand fixed contacts in Fig. 4 of the switches 112, 114 and 116 are joined together and connected to one end of a solenoid 110. The other end of solenoid 110 is connected to the negative terminal of the source of direct current 74. Solenoid 110 is mechanically linked to the wiper arm 66 in a manner to operate the sequencing device in the reverse direction. As with the system of Fig. 2, a signaling switch at any station can not sequence the equipment unless its turn has arrived as shown by illumination of the associated signal lamp. However, unlike the circuit of Fig. 2, the operator can with the circuit of Fig. 4 operate the appropriate switch 112, 114 or 116 to determine whether pressing the signal button will advance or retard the sequencing device.

If desired, the test and by-pass circuit of Fig. 2 can be added to the circuit of Fig. 4. This has not been shown in Fig. 4 in order to avoid undue complication thereof.

Although the present invention has been described with reference to certain preferred embodiments thereof, it will be understood by those skilled in the art that numerous changes may be made therein without departing from the true spirit thereof as defined in the appended claims.

What is claimed is:

1. A signaling system for a plurality of separate stations at each of which a distinct manually initiated operation is performed; said signaling system being adapted to report and direct the performance of said operations at the respective stations in a predetermined sequential order and comprising: an indicator associated with each station, a manually operable switch associated with each station, a central selector device, and means intercoupling said indicators, switches and selector device so that only one indicator can be actuated by the selector device at a time, and actuation by the selector device of an indicator associated with one station is acompanied by simultaneous conditioning of the switch associated with that station so that subsequent operation of the switch causes operation of the selector device to actuate the indicator and condition the switch associated with the next succeeding station in said sequence.

2. A signaling system for supervising the sequential performance in a predetermined order of a plurality of separate operations each requiring manual initiation and to be performed at a like number of separate stations, comprising an indicator at each of the stations for indicating upon actuation when an operation is to be performed at a particular station, a manually operable switch associated with each indicator, a central control device, and means coupling said central control device with said switches and said indicators such that with respect to said switches, only sequential operation thereof in said predetermined order can cause said control device to operate, operation of said control device by said switches causing said indicators to be actuated sequentially in said predetermined order, the phase relationship between said switch and indicator operation being such that operation of said switch at a selected station must occur next in time after the actuation of the indicator associated therewith.

3. A signaling system for supervising the sequential performance in a predetermined order of a plurality of separate operations each requiring manual initiation and to be performed at a like number of separate stations, comprising an indicator at each of the stations for indicating upon actuation when an operation is to be performed at a particular station, a manually operable switch associated with each indicator, an electro-mechanical stepping switch at a central station, and means coupling said stepping switch with both said manually operable switch and said indicators such that with respect to said manually operable switches, only sequential operation thereof in said predetermined order can cause said stepping switch to operate, operation of said stepping switch by said manually operable switches causing said indicators to be actuated sequentially in said predetermined order, the phase relationship between said switch and indicator operation being such that operation of said manually operable switch at a selected station must occur next in time after the actuation of the indicator associated therewith.

4. A signaling system for a plurality of separate stations at each of which a distinct manually initiated operation is performed; said signaling system being adapted to report and direct the performance of said operations at the respective stations in a predetermined sequential order and comprising: an indicator associated with each station, a manually operable switch associated with each station, a central selector device, means intercoupling said indicators, switches and selector device so that only one indicator can be actuated by the selector device at a time, and actuation by the selector device of an indicator associated with one station is accompanied by simultaneous conditioning of the switch associated with that station so that subsequent operation of the switch causes operation of the selector device to actuate the indicator and condition the switch associated with the next succeeding station in said sequence, and manually operable means coupled to all of said indicators for simultaneously activating all such indicators upon operation thereof, to test thereby simultaneously the operativeness of all of said devices.

5. A signaling system for a plurality of separate stations at each of which a distinct manually initiated operation is performed; said signaling system being adapted to report and direct the performance of said operations at the respective stations in a predetermined sequential order and comprising: an indicator associated with each station, a manually operable switch associated with each station, a central selector device, means intercoupling said indicators, switches and selector device so that only one indicator can be actuated by the selector device at a time, and actuation by the selector device of an indicator associated with one station is accompanied by simultaneous conditioning of the switch associated with that station so that subsequent operation of the switch causes operation of the selector device to actuate the indicator and condition the switch associated with the next succeeding station in said sequence, and an auxiliary switch associated with each station, said auxiliary switches each being arranged upon operation to establish a circuit for by-passing the central selector device such that actuation of any one of said manually operable switches coincidently with operation of one of said auxiliary switches will cause operation of the selector device independent of the position thereof.

6. A signaling system for a plurality of separate stations at each of which a distinct manually initiated operation is performed; said signaling system being adapted to report and direct the performance of said operations at the respective stations in a predetermined sequential order and comprising: an indicator associated with each station, a manually operable switch associated with each station, a selector switch associated with each manually operable switch, a selector device; and means intercoupling said indicators, switches and selector device so that only one indicator can be actuated by the selector device at a time, and actuation by the selector device of an indicator associated with one station is accompanied by simultaneous conditioning of the switches associated with that station so that subsequent operation of the manually operable switch causes operation of the selector device in a forward or reverse direction, depending upon the position of the associated selector switch, to actuate the indicator and condition the switches associated respectively with the next succeeding or preceding station in said sequence.

7. A signaling system comprising in combination a plurality of switches, each at a different one of a plurality of independent stations; an indicating device at each station; a source of operating current; a sequencing switch; and circuit means interconnecting all of said station switches and indicating devices with said sequencing switch and said source of operating current such that for each position of said sequencing switch both the indicating device and switch at a selected station in a determined order are simultaneously energized by said source, the indicating device to indicate actuation of the switch at the immediately preceding station in said order, and the switch upon subsequent actuation to advance the sequencing switch so as to energize the switch and indicating device at the next station in said order.

8. A signaling system comprising in combination at least three switches, each at a different one of a like number of independent stations; an indicating device at each station associated with each switch; a source of operating current; a sequencing switch; circuit means interconnecting all of said station switches and indicating devices with said sequencing switch and said source of operating current such that for each position of said sequencing switch both the indicating device and switch at a selected station in a predetermined order are simultaneously energized by said source, the indicating device to indicate actuation of the switch at the immediately preceding station in said order, and the switch upon subsequent actuation to advance the sequencing switch so as to energize the switch and indicating device at the next station in said order; and additional indicating devices at at least one of said stations, one connected in parallel with each of the switch associated indicating devices at the other stations for indicating at said one station the status of the entire system.

9. A signaling system according to claim 8, further comprising switch controlled means coupled between said source and said indicating devices for simultaneously energizing all such devices upon actuation thereof, to test thereby simultaneously the operativeness of all of said devices.

10. A signaling system for supervising the sequential performance in the proper order of the different operations required to be performed by the desk clerk, cashier, and housekeeper of a hotel, comprising separate means for each room of the hotel located at independent stations observable by the respective individuals for indicating when each is to perform his respective operation with respect to each such room, a manually operable device associated with each station for each of said rooms, a central control device for each of said rooms, and means coupling the central control device for each room with all of the manually operable devices and indicating means corresponding to the respective room responsive to manual operation of the related manually operable devices only in said proper order for causing the related indicating means to be activated sequentially in said proper order, whereby for each room the clerk is informed when it is ready for occupancy, the cashier is informed when it is occupied, and the housekeeper is informed when it is vacated.

11. A signaling system for supervising the sequential performance in the proper order of the different operations required to be performed by the desk clerk, cashier, and housekeeper of a hotel, comprising a supervisory panel for each housekeeper having for each room under her care at least one signal lamp and one manually operable switch, a supervisory panel for use by the clerk, a supervisory panel for use by the cashier, the last two mentioned panels each having for each room in the hotel at least one signal lamp and one manually operable switch, a central control device for each room in the form of a sequencing switch device, a source of electrical energy, and means for each room coupling said source through the corresponding sequencing switch device to all of the signal lamps and manually operable switches corresponding to such room, said sequencing switch device being responsive to manual operation of the related manually operable switches only in said proper order for causing the related signal lamps to be energized sequentially in said proper order, whereby for each room the clerk is informed when it is ready for occupancy, the cashier is informed when it is occupied, and the appropriate housekeeper is informed when it is vacated.

12. A signaling system according to claim 11, further comprising at the supervisory panel for use of the clerk, for each room, two additional signal lamps connected in parallel, respectively, with the signal lamps for the same room at the other supervisory panels for informing the clerk as to the status of all the rooms in the hotel.

13. A signaling system for supervising the sequential performance in the proper order of the different operations required to be performed by the desk clerk, cashier, and housekeeper of a hotel, comprising separate means for each room of the hotel located at independent stations observable by the respective individuals for indicating when each is to perform his respective operation with respect to each such room, a manually operable switch device associated with each station for each of said rooms, a central control device for each of said rooms in the form of an electro-mechanical switching assembly having switching elements and means for causing sequential switching thereof, a source of electrical energy having a pair of terminals, means for each room coupling one of said terminals to the switching elements of the corresponding switch assembly which switching elements are in turn coupled to the indicating means and manually operable switch devices corresponding to such room such that operation of said switching assembly results in sequentially coupling said one terminal to the indicating means and manually operable switch device at each of said stations in said proper sequential order, and means for each room coupling the other of said terminals through the means for causing switching of the corresponding switch assembly to all of the manually operable switch devices for such room, said switch assembly thereby being responsive to manual operation of the related manually operable devices only in said proper order for causing the related indicating means to be activated sequentially in said proper order, whereby for each room the clerk is informed when it is ready for occupancy, the cashier is informed when it is occupied, and the housekeeper is informed when it is vacated.

14. A signaling system according to claim 13, wherein each of said switching assemblies comprises a stepping relay having a rotary wiper contact, a plurality of fixed contacts sequentially engageable by said wiper contact, and a solenoid for causing sequential operation of said wiper contact, the wiper contact being coupled to said one terminal and the fixed contacts being coupled respectively to the related manual switch device and indicator means at respective stations.

References Cited in the file of this patent

UNITED STATES PATENTS

| | | |
|---|---|---|
| 1,273,661 | Perry | July 23, 1918 |
| 2,559,746 | Ahlberg | July 10, 1951 |
| 2,572,541 | Thompson et al. | Oct. 23, 1951 |
| 2,746,001 | Holmes et al. | May 15, 1956 |

UNITED STATES PATENT OFFICE
CERTIFICATE OF CORRECTION

Patent No. 2,980,890                  April 18, 1961

Raymond J. Staten

It is hereby certified that error appears in the above numbered patent requiring correction and that the said Letters Patent should read as corrected below.

In the grant, line 3, address of assignee, for "Washington, New York" read -- Port Washington, New York --; in the heading to the printed specification, line 5, for "Washington, N. Y." read -- Port Washington, N. Y. --.

Signed and sealed this 19th day of September 1961.

(SEAL)
Attest:

ERNEST W. SWIDER
Attesting Officer

DAVID L. LADD
Commissioner of Patents

USCOMM-DC